US010164286B2

United States Patent
Kuribayashi et al.

(10) Patent No.: US 10,164,286 B2
(45) Date of Patent: Dec. 25, 2018

(54) SEPARATOR-FITTED SINGLE FUEL CELL INDUCING JOINT PORTION WITH PROTRUDING PORTION AND SEALING PORTION, AND FUEL CELL STACK (71) Applicant: NGK SPARK PLUG CO., LTD., Nagoya-shi, Aichi (JP)

(72) Inventors: Makoto Kuribayashi, Ichinomiya (JP); Yasuo Okuyama, Kasugai (JP); Etsuya Ikeda, Kasugai (JP)

(73) Assignee: NGK SPARK PLUG CO., LTD., Nagoya-shi, Aichi (JP)

( * ) Notice: Subject to any disclaimer, the term of this patent is extended or adjusted under 35 U.S.C. 154(b) by 330 days.

(21) Appl. No.: 15/032,344

(22) PCT Filed: Oct. 23, 2014

(86) PCT No.: PCT/JP2014/005383
§ 371 (c)(1),
(2) Date: Apr. 27, 2016

(87) PCT Pub. No.: WO2015/064067
PCT Pub. Date: May 7, 2015

(65) Prior Publication Data
US 2016/0276680 A1 Sep. 22, 2016

(30) Foreign Application Priority Data

Oct. 29, 2013 (JP) .................................. 2013-224096

(51) Int. Cl.
*H01M 8/124* (2016.01)
*H01M 8/0206* (2016.01)
(Continued)

(52) U.S. Cl.
CPC ....... *H01M 8/2483* (2016.02); *H01M 8/0206* (2013.01); *H01M 8/0256* (2013.01);
(Continued)

(58) Field of Classification Search
CPC ............. H01M 8/2483; H01M 8/2457; H01M 8/0206; H01M 8/0256; H01M 8/0273;
(Continued)

(56) References Cited

U.S. PATENT DOCUMENTS

2010/0143760 A1* 6/2010 DeRose .............. H01M 8/0271
429/495

FOREIGN PATENT DOCUMENTS

JP 2000-331692 A 11/2000 .............. H01M 8/02
JP 3466960 B2 11/2003 .............. H01M 8/02
(Continued)

OTHER PUBLICATIONS

Hotta, Nobuyuki, Machine Translation of JP-2013033621-A, Feb. 2013 (Year: 2013).*
(Continued)

*Primary Examiner* — Sean P Cullen
(74) *Attorney, Agent, or Firm* — Kusner & Jaffe (57) ABSTRACT

A separator-fitted single fuel cell having a single fuel cell, a plate-shaped metallic separator that includes a through hole, and a joint portion that joins the single fuel cell to the metallic separator and is made of a brazing material containing Ag. The joint portion includes a protruding portion that protrudes from a gap between the single fuel cell and the first main surface of the metallic separator toward the through hole. The protruding portion is lower than the second main surface as viewed from the single fuel cell. The single fuel cell includes a sealing portion that is disposed along the entire circumference of the through hole of the metallic separator, covers the protruding portion and a part of the second main surface, and is made of a sealing material containing glass.

5 Claims, 5 Drawing Sheets (51) Int. Cl.
*H01M 8/0256* (2016.01)
*H01M 8/0273* (2016.01)
*H01M 8/0282* (2016.01)
*H01M 8/0297* (2016.01)
*H01M 8/1213* (2016.01)
*H01M 8/2425* (2016.01)
*H01M 8/2457* (2016.01)
*H01M 8/2483* (2016.01)

(52) U.S. Cl.
CPC ....... *H01M 8/0273* (2013.01); *H01M 8/0282* (2013.01); *H01M 8/0297* (2013.01); *H01M 8/1213* (2013.01); *H01M 8/2425* (2013.01); *H01M 8/2457* (2016.02); *H01M 2008/1293* (2013.01); *H01M 2300/0074* (2013.01)

(58) Field of Classification Search
CPC ............. H01M 8/0282; H01M 8/0297; H01M 8/1213; H01M 8/2425
USPC .................................. 429/457, 518, 519, 522
See application file for complete search history.

(56) References Cited

FOREIGN PATENT DOCUMENTS

| JP | 2004-319286 A | 11/2004 | ............. H01M 4/86 |
|---|---|---|---|
| JP | 2008-293843 A | 12/2008 | ............. H01M 8/02 |
| JP | 2009-009802 A | 1/2009 | ............. B23K 1/00 |
| JP | 2013033621 A | * 2/2013 | |

OTHER PUBLICATIONS

International Search Report issued in corresponding International Patent Application No. PCT/JP2014/005383, dated Jan. 6, 2015.

* cited by examiner

SEPARATOR-FITTED SINGLE FUEL CELL INCLUDING JOINT PORTION WITH PROTRUDING PORTION AND SEALING PORTION, AND FUEL CELL STACK

RELATED APPLICATIONS

This application is a National Stage of International Application No. PCT/JP14/05383 filed Oct. 23, 2014, which claims the benefit of Japanese Patent Application No. 2013-224096, filed Oct. 29, 2013.

FIELD OF THE INVENTION

The present invention relates to a separator-fitted single fuel cell, and a fuel cell stack.

BACKGROUND OF THE INVENTION

Solid oxide fuel cells (hereinafter, abbreviated as "SOFC" or simply referred to as "fuel cells") that use a solid oxide as an electrolyte have been known. An SOFC includes a stack (fuel cell stack) that includes a plurality of stacked single fuel cells each including, for example, an anode and a cathode disposed on the surfaces of a plate-shaped solid electrolyte layer. A fuel gas (for example, hydrogen) and an oxidant gas (for example, oxygen contained in the air) are supplied to the anode and the cathode, respectively. A chemical reaction occurs through the solid electrolyte layer, so that electric power is generated.

In general, the fuel cell is used in a state in which it is connected to a separator separating compartments in which a fuel gas and an oxidant gas are present, respectively. Therefore, a technique for joining the single fuel cell to the separator by Ag brazing filler metal or glass is disclosed (see Japanese Patent No. 03466960).

However, in the case where the single fuel cell is joined to the separator by Ag brazing filler metal, there is a concern that hydrogen and oxygen are diffused in the Ag brazing filler metal and are bonded to each other, whereby voids are generated. When voids are generated, a gas passage may be formed in the Ag brazing filler metal, and a gas may leak.

Further, in the case where the single fuel cell is joined to the separator by glass, diffusion of hydrogen and oxygen in the joint portion can be prevented. In this case, joining strength becomes low because the joint portion of glass is peeled or broken during the formation of a fuel cell stack. This tends to cause a gas leak.

An advantage of the present invention is a separator-fitted single fuel cell and a fuel cell stack in which the reliability of joining and sealing between a single fuel cell and a separator is improved.

SUMMARY OF THE INVENTION (1) In accordance with a first aspect of the present invention, there is provided a separator-fitted single fuel cell comprising:
a single fuel cell that includes a cathode, an anode, and a solid electrolyte layer disposed between the cathode and the anode;
a plate-shaped metallic separator that has a first main surface, a second main surface, and a through hole passing through the metallic separator between the first and second main surfaces; and
a joint portion that joins the single fuel cell to the first main surface of the metallic separator and is made of a brazing material containing Ag,
the separator-fitted single fuel cell being characterized in that
the joint portion includes a protruding portion that protrudes from a gap between the single fuel cell and the first main surface of the metallic separator toward the through hole, and
the protruding portion is lower than the second main surface as viewed from the single fuel cell, and
the single fuel cell includes a sealing portion that is disposed along the entire circumference of the through hole, covers the protruding portion and a part of the second main surface, and is made of a sealing material containing glass.

The joint portion includes "a protruding portion that protrudes from a gap between the single fuel cell and the first main surface of the metallic separator toward the through hole." For this reason, a difference in level between the metallic separator and the single fuel cell is reduced by the protruding portion (the protruding portion partially fills a space formed due to the level difference). As a result, defective formation of the sealing portion, which seals the joint portion, (sinking of glass) is prevented and the joint portion can be more reliably sealed by the sealing portion. Notably, when the protruding portion is higher than the second main surface (upper surface) of the metallic separator, the difference in level rather increases and there is a concern that defective formation of the sealing portion (sinking of glass) may occur.

Further, since the metallic separator is joined to the single fuel cell by the joint portion, deformation of the sealing portion is prevented when stress is applied from the outside. Accordingly, it is possible to reduce a possibility of breakage of the sealing portion.

Furthermore, since the sealing portion is disposed closer to the through hole than the joint portion, the joint portion does not directly come into contact with the oxidant gas. Accordingly, the contact between oxygen and the joint portion is prevented. As a result, since diffusion of oxygen into the joint portion is suppressed, it is possible to prevent generation of voids that are generated as a result of the reaction of hydrogen with oxygen.

(2) In accordance with a second aspect of the present invention, there is provided a fuel cell as described above, wherein the protruding portion is higher than the first main surface as viewed from the single fuel cell.

When the protruding portion is higher than the first main surface (lower surface) of the metallic separator, the difference in level is further reduced. Accordingly, defective formation of the sealing portion (sinking of glass) is more reliably prevented.

(3) In accordance with a third aspect of the present invention, there is provided a fuel cell as described above, wherein the metallic separator may contain Al in an amount of 1.5 mass % or more to 10 mass % or less, the joint portion may contain an oxide or complex oxide of Al in an amount of 1 volume % or more to 25 volume % or less, and the sealing portion may contain Al in an amount of 1 mass % or more to 30 mass % or less as reduced to $Al_2O_3$.

Since each of the metallic separator, the joint portion, and the sealing portion contains Al, each of the metallic separator, the joint portion, and the sealing portion has a good affinity. As a result, defective formation of the sealing portion (sinking of glass) becomes less likely to occur. In particular, since the metallic separator contains Al in an amount of 1.5 mass % or more to 10 mass % or less, the joint portion contains an oxide or complex oxide of Al in an amount of 1 volume % or more to 25 volume % or less, and the sealing portion contains Al in an amount of 1 mass % or more to 30 mass % or less as reduced to $Al_2O_3$, defective formation of the sealing portion (sinking of glass) becomes less likely to occur. As a result, the reliability of joining and sealing is improved.

(4) In accordance with a fourth aspect of the present invention, there is provided a fuel cell as described above, wherein the oxide or complex oxide of Al may include $Al_2O_3$, an Al-containing spinel oxide, or mullite.

It is possible to improve the affinity by using these oxides of Al.

(5) In accordance with a fifth aspect of the present invention, there is provided a fuel cell stack that includes a plurality of separator-fitted single fuel cells according to any one of (1) to (4), as described above.

It is possible to provide a fuel cell stack in which the reliability of joining and sealing is improved.

According to the present invention, it is possible to provide a separator-fitted single fuel cell and a fuel cell stack in which the reliability of joining and sealing between a single fuel cell and a separator is improved.

BRIEF DESCRIPTION OF DRAWINGS

FIG. 7 is a cross-sectional view of a fuel cell 40a.

DETAILED DESCRIPTION OF THE PREFERRED EMBODIMENTS

A solid oxide fuel cell stack according to the present invention will be described below with reference to the drawings.

Figure 1:
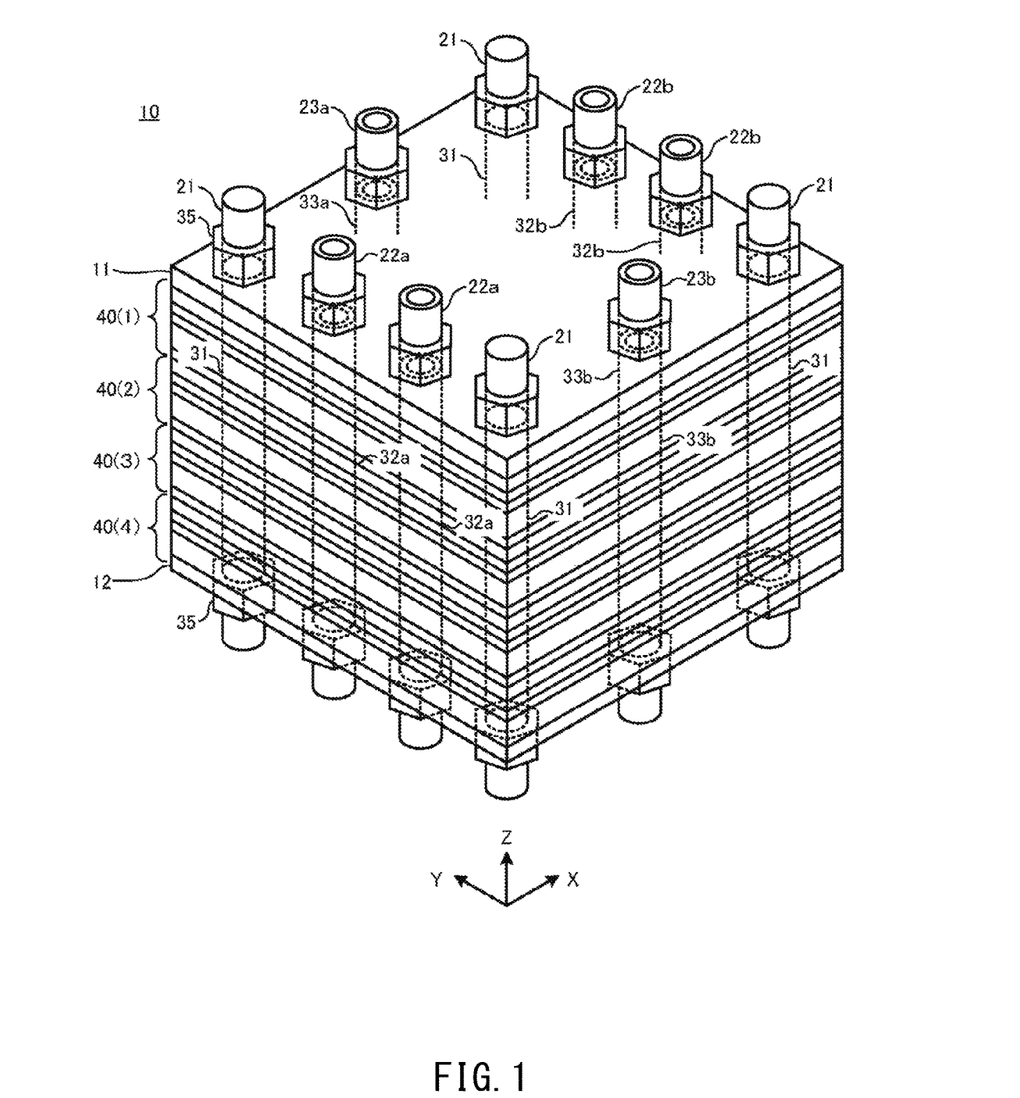
FIG. 1 is a perspective view showing a solid oxide fuel cell stack 10.

FIG. 1 is a perspective view of a solid oxide fuel cell stack (fuel cell stack) 10 according to an embodiment of the present invention. The solid oxide fuel cell stack 10 generates electric power through the supply of a fuel gas (for example, hydrogen) and an oxidant gas (for example, air (specifically, oxygen contained in the air)).

The solid oxide fuel cell stack 10 includes end plates 11 and 12 and fuel cells 40(1) to 40(4) that are stacked and fixed together by bolts 21, 22a, 22b, 23a, and 23b and nuts 35.

Figure 2:
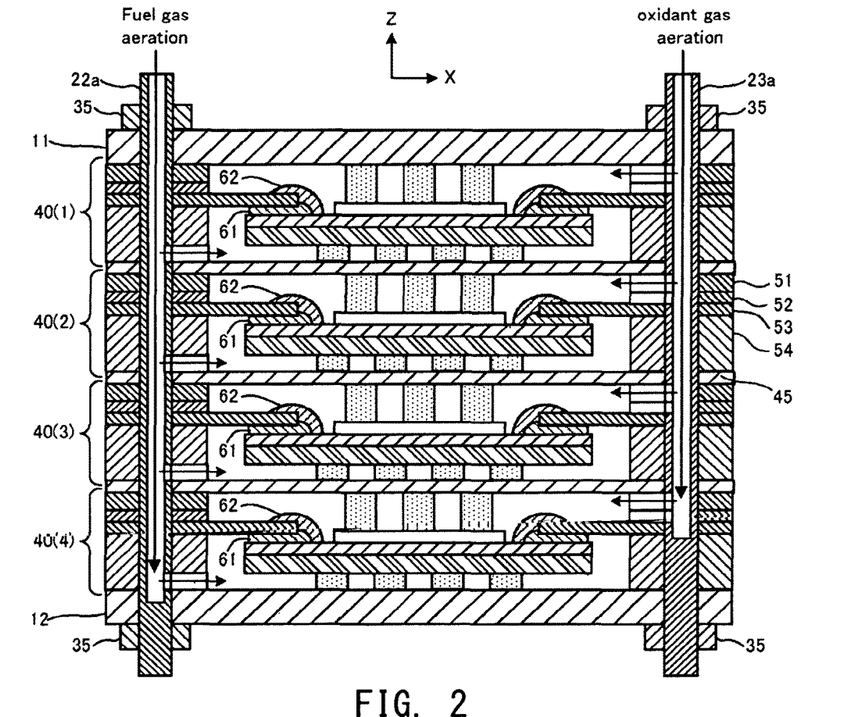
FIG. 2 is a schematic cross-sectional view of the solid oxide fuel cell stack 10.

FIG. 2 is a schematic cross-sectional view of the solid oxide fuel cell stack 10. The solid oxide fuel cell stack 10 is a fuel cell stack that includes the stacked fuel cells 40(1) to 40(4). For the ease of understanding, the four fuel cells 40(1) to 40(4) are stacked in the embodiment. However, about 20 to about 60 fuel cells 40 are generally stacked.

The end plates 11 and 12 and the fuel cells 40(1) to 40(4) include through holes 31, 32a, 32b, 33a, and 33b for the bolts 21, 22a, 22b, 23a, and 23b, respectively. The end plates 11 and 12 are holding plates that press and hold the stacked fuel cells 40(1) to 40(4) and also serve as output terminals for current from the fuel cells 40(1) to 40(4).

Figure 3:
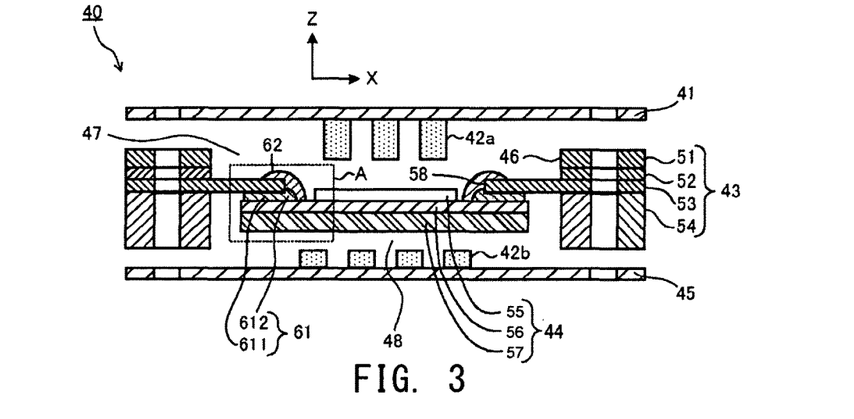
FIG. 3 is a cross-sectional view of a fuel cell 40.
Figure 4:
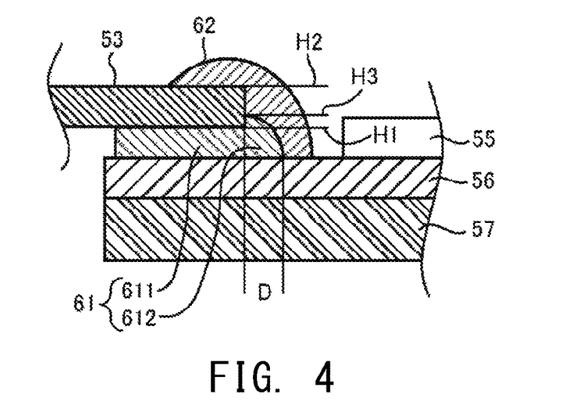
FIG. 4 is an enlarged cross-sectional view of a portion of the fuel cell 40 that is present in a frame A.
Figure 5:
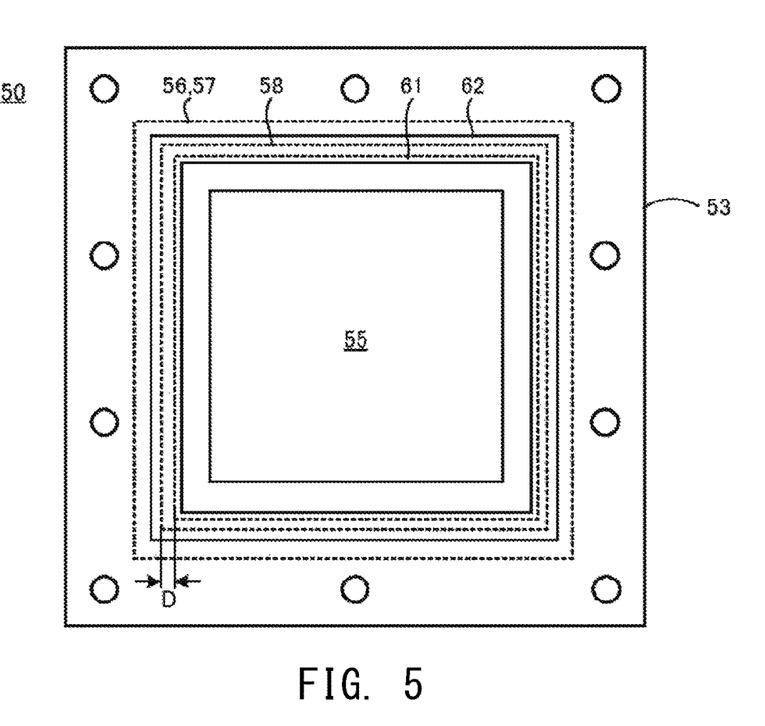
FIG. 5 is a top view of a separator-fitted single fuel cell 50.

FIG. 3 is a cross-sectional view of the fuel cell 40. FIG. 4 is an enlarged cross-sectional view of a portion of the fuel cell 40 that is present in a frame A. FIG. 5 is a top view of a single fuel cell 44 and a metallic separator 53 (a separator-fitted single fuel cell 50).

As shown in FIG. 3, the fuel cell 40 has the metallic separator 53 and the single fuel cell 44 and includes interconnectors 41 and 45, current collecting members 42a and 42b, and a frame unit 43.

The single fuel cell 44 is formed by holding a solid electrolyte layer 56 between a cathode (also referred to as a cathode layer) 55 and an anode (also referred to as an anode layer) 57. The cathode 55 is disposed on the surface of the solid electrolyte layer 56 facing an oxidant gas path 47, and the anode 57 is disposed on the surface of the solid electrolyte layer 56 facing a fuel gas path 48.

Perovskite-based oxides (such as LSCF (lanthanum strontium cobalt iron oxide) and LSM (lanthanum strontium manganese oxide)) may be used for the cathode 55.

Materials such as YSZ, ScSZ, SDC, GDC, and perovskite-based oxides may be used for the solid electrolyte layer 56.

Metals are preferably used for the anode 57, and Ni, and Ni-ceramic cermet may be used.

Each of the interconnectors 41 and 45 is a plate-shaped conductive member (for example, made of a metal such as stainless steel) that can ensure electrical continuity between adjacent single fuel cells 44 and prevent gasses from being mixed with each other between the adjacent single fuel cells 44.

Notably, one interconnector (41 or 45) is disposed between adjacent single fuel cells 44 (since two single fuel cells 44 connected in series share one interconnector). In the uppermost and lowermost single fuel cells 44, the conductive end plates 11 and 12 are disposed instead of the interconnectors 41 and 45, respectively.

The current collecting member 42a is used to ensure electrical continuity between the interconnector 41 and the cathode 55 of the single fuel cell 44 and includes, for example, protrusions formed on the interconnector 41. The current collecting member 42b is used to ensure electrical continuity between the interconnector 45 and the anode 57 of the single fuel cell 44. For example, air-permeable nickel felt, nickel mesh, or the like may be used as the current collecting member 42b.

The frame unit 43 has an opening 46 through which the oxidant gas and the fuel gas flow. The opening 46 is hermetically sealed, and the inside thereof is divided into the oxidant gas path 47 through which the oxidant gas flows and the fuel gas path 48 through which the fuel gas flows. Further, the frame unit 43 of this embodiment includes a cathode frame 51, an insulating frame 52, the metallic separator 53, and an anode frame 54.

The cathode frame 51 is a metallic frame disposed on the cathode 55 side, and has the opening 46 at the central portion thereof. The oxidant gas path 47 is defined by the opening 46.

The insulating frame 52 is a frame that electrically insulates the interconnector 41 and the interconnector 45 from each other. For example, ceramics such as $Al_2O_3$, mica, vermiculite, or the like may be used for the insulating frame 52, and the insulating frame 52 has the opening 46 at the central portion thereof. The oxidant gas path 47 is defined by the opening 46. Specifically, the insulating frame 52 is disposed between the interconnectors 41 and 45 so that one surface of the insulating frame 52 comes into contact with the cathode frame 51 and the other surface thereof comes into contact with the metallic separator 53. As a result, the interconnectors 41 and 45 are electrically insulated from each other by the insulating frame 52.

The metallic separator 53 is a frame-shaped metallic thin plate (for example, thickness: 0.1 mm) having a through hole 58. The metallic separator 53 is a metallic frame that is attached to the solid electrolyte layer 56 of the single fuel cell 44 and prevents the oxidant gas and the fuel gas from being mixed with each other. The space in the opening 46 of the frame unit 43 is divided into the oxidant gas path 47 and the fuel gas path 48 by the metallic separator 53, so that the mixing of the oxidant gas and the fuel gas is prevented.

The cathode 55 of the single fuel cell 44 is disposed in the through hole 58 that extends through the metallic separator 53 between the upper surface (second main surface) and the lower surface (first main surface) of the metallic separator 53. The single fuel cell 44 to which the metallic separator 53 is joined is referred to as a "separator-fitted single fuel cell." Notably, the details thereof will be described below.

Similar to the insulating frame 52, the anode frame 54 is an insulating frame disposed on the anode 57 side, and has the opening 46 at the central portion thereof. The fuel gas path 48 is defined by the opening 46.

The cathode frame 51, the insulating frame 52, the metallic separator 53, and the anode frame 54 have the through holes 31, 32a, 32b, 33a, and 33b which are formed in the peripheral portions thereof and into which the bolts 21, 22a, 22b, 23a, and 23b are inserted or through which the oxidant gas or the fuel gas flows.

Detail of Separator-Fitted Single Fuel Cell 50

In this embodiment, a joint portion 61 and a sealing portion 62 are disposed between the single fuel cell 44 and the metallic separator 53, so that the separator-fitted single fuel cell 50 is formed. The lower surface of the metallic separator 53 and the upper surface of the solid electrolyte layer 56 are joined along the through hole 58 through the joint portion 61 and sealed by the sealing portion 62.

The metallic separator 53 is made of a metal material containing iron (Fe) and chromium (Cr) as main components, and contains Al. As a result, an alumina coating is formed on the surface of the metallic separator 53 and oxidation resistance is improved. Further, since Ag brazing filler metal of the joint portion 61 contains Al and the metallic separator 53 contains Al, both of the joint portion 61 and the metallic separator 53 have good affinity to glass of the sealing portion 62. Accordingly, the strength of joining and the air-tightness of sealing (sealing in which a gap is not formed between an interface of the metallic separator 53 and the sealing portion 62) can be ensured. This, combined with reduction of a difference in level by a protruding portion 612 to be described below, prevents defective formation (sinking of glass) of the sealing portion 62 is also prevented. Meanwhile, the details thereof will be described below.

It is preferable that the metallic separator 53 contains Al in an amount of 1.5 mass % or more and less than 10 mass % (for example, 3 mass % of Al). The reason for this is as follows. In the case where the Al content of the metallic separator 53 is less than 1.5 mass %, oxidation resistance deteriorates because Al is likely to be exhausted due to the partial reaction between the alumina coating and glass during joining by the joint portion 61 (glass joining) (in the case where the amount of Al to be added is less than 1 mass %, the effect of oxidation resistance cannot be expected because Al is exhausted in a short time).

In terms of resistance against the exhaustion of Al, it is preferable that the metallic separator 53 contains 2 mass % or more of Al. Meanwhile, when the metallic separator 53 contains 10 mass % or more of Al, the metallic separator 53 becomes hard, and machining and relaxation of stress become difficult.

When the Al content is 1.5 mass % or more, the alumina coating of the metallic separator 53 has an affinity to an oxide, which is contained in the joint portion 61 (Ag brazing filler metal) and contains Al, and the alumina coating and the oxide serve as anchor materials. As a result, joining is enhanced.

It is preferable that the metallic separator 53 has a thickness of 0.5 mm or less (for example, 0.1 mm). When the thickness of the metallic separator 53 exceeds 0.5 mm, stresses applied to the sealing portion 62 and the joint portion 61 connecting the single fuel cell 44 to the metallic separator 53 during the formation of the solid oxide fuel cell stack 10 (fuel cell stack) are not relaxed. For this reason, there is a concern that the joint portion 61 or the sealing portion 62 may be damaged (broken).

The joint portion 61 is disposed along the entire circumference of the through hole 58 to join the single fuel cell 44 to the lower surface (first main surface) of the metallic separator 53, and has a joint portion main body 611 and a protruding portion 612. The joint portion main body 611 is a portion disposed between the single fuel cell 44 and the lower surface (first main surface) of the metallic separator 53. The protruding portion 612 is a portion that protrudes from the gap between the single fuel cell 44 and the lower surface (first main surface) of the metallic separator 53 (protrusion of a width D).

For example, the joint portion main body 611 has a width in the range of 2 to 6 mm and a thickness in the range of 10 to 80 μm. For example, the protruding portion 612 has a width D in the range of 100 μm to 500 μm and a height H3 (thickness) in the range of 10 to 160 μm.

Figure 6:
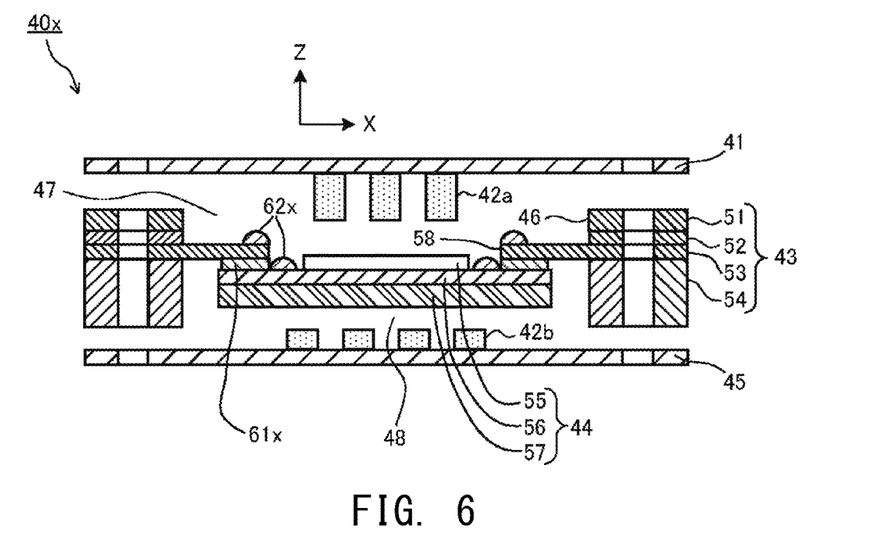
FIG. 6 is a cross-sectional view of a fuel cell 40x.

A difference in level is present between the metallic separator 53 and the single fuel cell 44. For this reason, there is a possibility that defective formation of the sealing portion 62 (sinking of glass) may occur due to this difference in level. FIG. 6 shows a separator-fitted single fuel cell 50 which uses a joint portion 61x not including the protruding portion 612 and in which a sealing portion 62x having a shape defect is formed. Since the sealing portion 62x is divided into two pieces due to a difference in level between the metallic separator 53 and the single fuel cell 44, the wall surface of the through hole 58 of the metallic separator 53 and the inner peripheral surface of the joint portion 61x are not covered with the sealing portion 62x. That is, partially due to the affinity of the sealing material to the metallic separator 53 and the joint portion 61x, the sealing material is repelled from the side surfaces of the metallic separator 53 and the joint portion 61 (the step) and the sealing portion 62x is divided into two pieces. As a result, an oxidant gas directly comes into contact with the joint portion 61x and voids are likely to be generated in the joint portion 61x.

In contrast, in this embodiment, the difference in level between the metallic separator 53 and the single fuel cell 44 is reduced by the protruding portion 612 (the protruding portion 612 partially fills a corner space formed due to the level difference). As a result, defective formation of the sealing portion 62, which seals the joint portion 61, (sinking of glass) is prevented and the joint portion 61 can be more reliably sealed by the sealing portion 62.

In this embodiment, the height H3 of the protruding portion 612 from the upper surface of the solid electrolyte layer 56 is greater than the height H1 of the lower surface (first main surface) of the metallic separator 53 from the upper surface of the solid electrolyte layer 56, and is equal to or less than the height H2 of the upper surface (second main surface) of the metallic separator 53 from the upper surface of the solid electrolyte layer 56.

When the height H3 of the protruding portion 612 is greater than the height H1 of the lower surface of the metallic separator 53, the difference in level is reduced as compared with the case where the height H3 is less than the height H1. Accordingly, defective formation of the sealing portion 62 (sinking of glass) is more reliably prevented. Meanwhile, when the protruding portion 612 is higher than the upper surface of the metallic separator 53, the difference in level rather increases and there is a concern that defective formation of the sealing portion 62 (sinking of glass) may occur.

It is preferable that a brazing material (Ag brazing filler metal) containing an oxide or complex oxide of Al and containing Ag as a main component is used for the joint portion 61. Examples of the brazing material include a material obtained by adding $Al_2O_3$, an Al-containing spinel oxide ($MgAl_2O_4$ or the like), or mullite (a compound of aluminum oxide and silicon dioxide), which is stable in a reducing atmosphere, to Ag as a filler, and an alloy obtained by adding at least Al to Ag. These materials may be combined with each other.

Since the properties of a material used for the cathode 55 change in a vacuum or reducing atmosphere, it is preferable that the brazing material is brazed in the air in a joining process. Ag is not easily oxidized at a brazing temperature even in the atmosphere. For this reason, when Ag brazing filler metal is used, the single fuel cell 44 and the metallic separator 53 can be joined to each other in the atmosphere.

Since the oxide or complex oxide of Al, which is contained in the joint portion 61, has an affinity to the alumina coating formed on the surface of the metallic separator 53 and serves as an anchor material, joining strength is improved. Further, since wettability is improved, it is possible to prevent Ag brazing filler metal from being repelled from the metallic separator 53 during the brazing. Furthermore, even when the joint portion 61 causes sagging of brazing filler metal or position shift and needs to come into contact with the sealing portion 62, since the oxide or complex oxide of Al formed on the surface of the Ag brazing filler metal has an affinity to glass containing Al, it is possible to prevent a gap from being generated on the interface between the Ag brazing filler metal and the sealing material.

The amount of the oxide or complex oxide of Al added to the joint portion 61 is 1 volume % or more (more preferably 2 volume % or more) and 25 volume % or less (more preferably 15 volume % or less). When the amount of the oxide or complex oxide of Al to be added exceeds 25 volume %, the necking between Ag particles contained in the joint portion 61 becomes weak. Accordingly, strength is reduced.

The sealing portion 62, which has, for example, a width of 1 to 4 mm and a thickness of 80 to 200 μm, is disposed along the entire circumference of the through hole 58 such that the sealing portion 62 is located on the through hole 58 side (on the inner side) of the joint portion 61, and seals the gap between the single fuel cell 44 and the metallic separator 53 to prevent mixing between the oxidant gas, which is present in the through hole 58 of the metallic separator 53, and the fuel gas, which is present outside the through hole 58. Since the sealing portion 62 is disposed on the through hole 58 side of the joint portion 61, the joint portion 61 does not come into contact with the oxidant gas. Accordingly, the movement of oxygen to the joint portion 61 from the oxidant gas path 47 is prevented. As a result, it is possible to prevent the leakage of a gas caused by voids that are generated in the joint portion 61 as a result of the reaction of hydrogen with oxygen. Moreover, since the sealing portion 62 is disposed between the metallic separator 53 and the single fuel cell 44, thermal stress applied to the sealing portion 62 is not tensile stress and is shear stress. For this reason, the sealing material is not easily broken, and it is possible to suppress peeling at the interface between the sealing portion 62 and the metallic separator 53 or the single fuel cell 44. Accordingly, it is possible to improve the reliability of the sealing portion 62.

It is preferable that the sealing portion 62 is made of a sealing material containing glass and contains Al in an amount of 1 mass % or more (more preferably 2 mass % or more) and 30 mass % or less (more preferably 20 mass % or less) as reduced to $Al_2O_3$.

When the amount of $Al_2O_3$ to be added is smaller than 1 mass %, the sealing portion 62 does not have an affinity to Ag brazing filler metal. Accordingly, Ag brazing filler metal is likely to be repelled during the sealing (heat treatment). When the amount of $Al_2O_3$ to be added is larger than 30 mass %, the thermal expansion coefficient of the sealing portion is low. For this reason, there is a concern that the sealing material may be broken due to a difference in thermal expansion between the metallic separator 53 and the sealing material.

The sealing portion 62 is disposed along the entire circumference of the through hole 58 of the metallic separator 53 and covers the protruding portion 612 and a part of the upper surface (second main surface) of the metallic separator 53. Since the sealing portion 62 is formed as a single portion in a region extending from the protruding portion 612 to the upper surface of the metallic separator 53, the reliability of joining and sealing is improved.

First Modification

Figure 7:
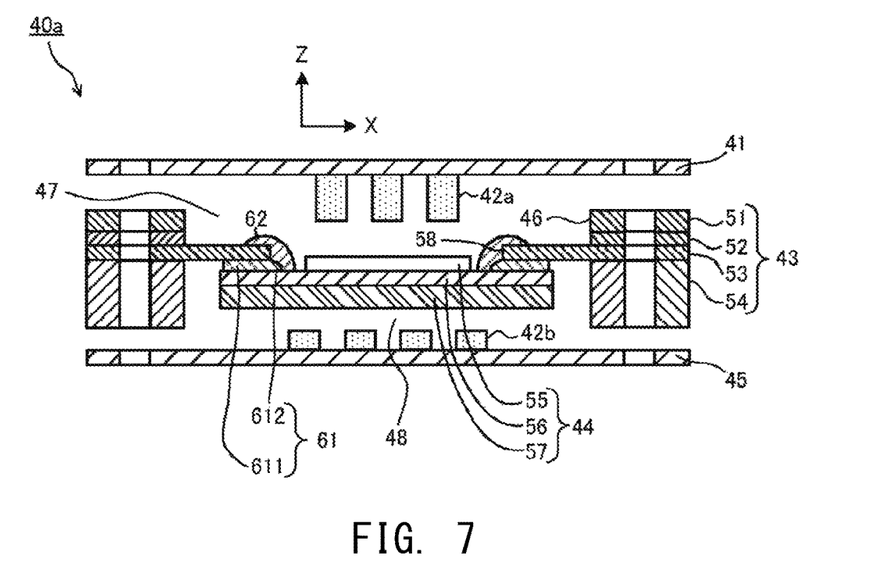

A first modification will be described. FIG. 7 is a cross-sectional view of a fuel cell 40a according to the first modification.

In the fuel cell 40a, the height H3 of the protruding portion 612 of the joint portion 61 is the same as the height H1 of the lower surface (first main surface) of the metallic separator 53. Since the difference in level between the metallic separator 53 and the single fuel cell 44 is reduced by the protruding portion 612 even in this case, defective formation of the sealing portion 62 (sinking of glass) is prevented.

Second Modification

Figure 8:
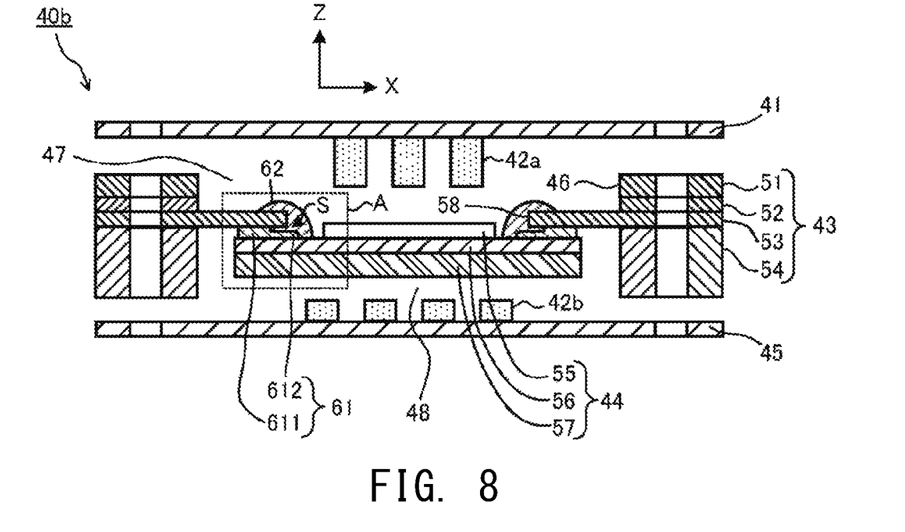
FIG. 8 is a cross-sectional view of a fuel cell 40b.
Figure 9:
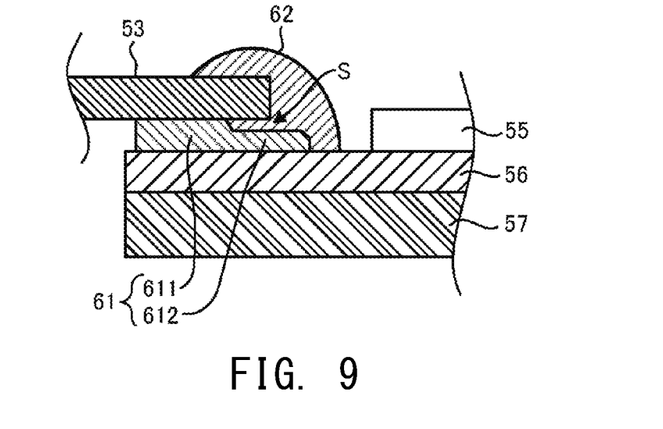
FIG. 9 is an enlarged cross-sectional view of a portion of the fuel cell 40b that is present in a frame A.

A second modification will be described. FIG. 8 is a cross-sectional view of a fuel cell 40b according to the second modification. FIG. 9 is an enlarged cross-sectional view of a portion of the fuel cell 40b that is present in a frame A.

In the fuel cell 40b, the height H3 of the protruding portion 612 of the joint portion 61 is smaller than the height H1 of the lower surface (first main surface) of the metallic separator 53. Since the difference in level between the metallic separator 53 and the single fuel cell 44 is reduced by the protruding portion 612 even in this case, defective formation of the sealing portion 62 (sinking of glass) is prevented.

Further, in the case of the fuel cell 40b, in a region near the through hole 58, the height H3 of the protruding portion 612 is smaller than the height H1 of the lower surface (first main surface) of the metallic separator 53 and a gap S is formed between the metallic separator 53 and the joint portion 61. If the thickness of the gap S is small to a certain extent (for example, 20 µm or less) even though such a gap S is formed, the gap S does not substantially obstruct the sealing performed by the sealing portion 62. That is, the gap S having a small thickness does not cause sinking of glass or the like. There is a possibility that the inner portion of the gap S may become a cavity without being filled with the sealing material. However, if the volume (cross-sectional area) of the gap S is sufficiently small (for example, a height of 20 µm or less and a depth of 200 µm or less) even though the gap S is formed, the amount of a gas (air or the like) held in the cavity is small. For this reason, the gap S does not cause a void to be generated in the joint portion 61.

Other Embodiments

Embodiments of the present invention are not limited to the above-mentioned embodiments and can be extended and modified, and the extended and modified embodiments are also included in the scope of the present invention.

DESCRIPTION OF REFERENCE NUMERALS

10: solid oxide fuel cell stack
11, 12: end plate
21, 22a, 22b, 23a, and 23b: bolt
31, 32a, 32b, 33a, and 33b: through hole
35: nut
40: fuel cell
41, 45: interconnector
42a, 42b: current collecting member
43: frame unit
44: single fuel cell
46: opening
47: oxidant gas path
48: fuel gas path
50: separator-fitted single fuel cell
51: cathode frame
52: insulating frame
53: metallic separator
54: anode frame
55: cathode
56: solid electrolyte layer
57: anode
58: through hole
61: joint portion
611: joint portion main body
612: protruding portion
62: sealing portion Having described the invention, the following is claimed:

1. A separator-fitted single fuel cell comprising:
a single fuel cell that includes a cathode, an anode, and a solid electrolyte layer disposed between the cathode and the anode;
a plate-shaped metallic separator that has a first main surface, a second main surface facing an opposite direction from the first main surface, and a through hole passing through the metallic separator between the first and second main surfaces;
a sealing portion disposed along an entire circumference of the through hole, the sealing portion being made of a sealing material containing glass; and
a joint portion that joins the solid electrolyte layer of the single fuel cell to the first main surface of the metallic separator,
the joint portion being made of a brazing material containing Ag,
the joint portion including a protruding portion that protrudes from a gap between the solid electrolyte layer of the single fuel cell and the first main surface of the metallic separator toward the through hole,
the protruding portion having a height from a surface of the solid electrolyte layer facing the first main surface that is less than a distance from the surface of the solid electrolyte layer facing the first main surface to the second main surface as viewed from the single fuel cell,
wherein the sealing portion covers the protruding portion and a part of the second main surface.

2. A separator-fitted single fuel cell according to claim 1, wherein the height of the protruding portion from the surface of the solid electrolyte layer facing the first main surface is greater than a distance from the surface of the solid electrolyte layer facing the first main surface to the first main surface as viewed from the single fuel cell.

3. A separator-fitted single fuel cell according to claim 1, wherein the metallic separator contains Al in an amount of 1.5 mass % or more to 10 mass % or less,
wherein the joint portion contains an oxide of Al or a complex oxide of Al in an amount of 1 volume % or more to 25 volume % or less, and
wherein the sealing portion contains Al in an amount of 1 mass % or more to 30 mass % or less as reduced to $Al_2O_3$.

4. A separator-fitted single fuel cell according to claim 3, wherein the oxide of Al or the complex oxide of Al includes $Al_2O_3$, an Al-containing spinel oxide, or mullite.

5. A fuel cell stack comprising:
a plurality of separator-fitted single fuel cells, each of said separator-fitted single fuel cells comprising:
a single fuel cell that includes a cathode, an anode, and a solid electrolyte layer disposed between the cathode and the anode;
a plate-shaped metallic separator that has a first main surface, a second main surface facing in an opposite direction from the first main surface, and a through hole passing through the metallic separator between the first and second main surfaces;
a sealing portion disposed along an entire circumference of the through hole, the sealing portion being made of a sealing material containing glass; and
a joint portion that joins the solid electrolyte layer of the single fuel cell to the first main surface of the metallic separator, the joint portion being made of a brazing material containing Ag, the joint portion including a protruding portion that protrudes from a gap between the solid electrolyte layer of the single fuel cell and the first main surface of the metallic separator toward the through hole, the protruding portion having a height from a surface of the solid electrolyte layer facing the first main surface that is less than a distance from the surface of the solid electrolyte layer facing the first main surface to the second main surface as viewed from the single fuel cell, wherein the sealing portion covers the protruding portion and a part of the second main surface.

* * * * *